(12) United States Patent
Yip et al.

(10) Patent No.: US 11,503,087 B2
(45) Date of Patent: Nov. 15, 2022

(54) METHOD AND APPARATUS FOR PROCESSING IMMERSIVE MEDIA

(71) Applicant: Samsung Electronics Co., Ltd., Suwon-si (KR)

(72) Inventors: Eric Yip, Suwon-si (KR); Hyunkoo Yang, Suwon-si (KR); Jaeyeon Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/469,265

(22) Filed: Sep. 8, 2021

(65) Prior Publication Data

US 2022/0078215 A1 Mar. 10, 2022

(30) Foreign Application Priority Data

Sep. 9, 2020 (KR) .......... 10-2020-0115549
Feb. 18, 2021 (KR) .......... 10-2021-0022121

(51) Int. Cl.
*H04L 65/1101* (2022.01)
*H04L 65/1069* (2022.01)
*H04W 28/20* (2009.01)
*H04L 65/70* (2022.01)
*H04N 5/232* (2006.01)

(52) U.S. Cl.
CPC ...... *H04L 65/1101* (2022.05); *H04L 65/1069* (2013.01); *H04L 65/70* (2022.05); *H04W 28/20* (2013.01); *H04N 5/23238* (2013.01)

(58) Field of Classification Search
None
See application file for complete search history.

(56) References Cited

U.S. PATENT DOCUMENTS

| | | | |
|---|---|---|---|
| 2017/0339392 A1* | 11/2017 | Forutanpour | H04N 19/46 |
| 2019/0104326 A1* | 4/2019 | Stockhammer | H04N 21/816 |
| 2019/0222823 A1* | 7/2019 | Clagg | H04N 13/344 |
| 2019/0268599 A1* | 8/2019 | Hannuksela | G06T 9/004 |
| 2019/0363843 A1* | 11/2019 | Gordaychik | H04W 52/58 |
| 2020/0020077 A1* | 1/2020 | You | H04L 65/765 |

(Continued)

FOREIGN PATENT DOCUMENTS

| | | | |
|---|---|---|---|
| KR | 10-2018-0040480 A | 4/2018 | |
| WO | WO-2018083378 A1 * | 5/2018 | H04N 19/167 |

*Primary Examiner* — Jeffrey R Swearingen
(74) *Attorney, Agent, or Firm* — Jefferson IP Law, LLP

(57) ABSTRACT

The disclosure relates to a fifth generation (5G) communication system or a sixth generation (6G) communication system for supporting higher data rates beyond a fourth generation (4G) communication system such as long term evolution (LTE). The disclosure provides rendering of fisheye 360 degree video contents, including fisheye circular image videos. A method of a transmitting device is provided. The method includes transmitting, to a receiving device, a Session Description Protocol (SDP) offer message for negotiation of parameter associated with a fisheye image, and receiving, from the receiving device, a fisheye SDP answer message including second fisheye image related information generated based on first fisheye image related information included in the SDP offer message. wherein the first fisheye image related information includes first maximum packing information indicating a maximum number of fisheye images that is available to be packed into one stream.

20 Claims, 15 Drawing Sheets

(56) References Cited

U.S. PATENT DOCUMENTS

| | | | |
|---|---|---|---|
| 2020/0374505 A1* | 11/2020 | Kammachi Sreedhar | ................... H04N 19/167 |
| 2022/0046200 A1* | 2/2022 | Luo | ......................... H04N 5/378 |
| 2022/0078215 A1* | 3/2022 | Yip | ..................... H04L 65/1016 |
| 2022/0196470 A1* | 6/2022 | Fontenele | ................ G01C 9/24 |
| 2022/0201457 A1* | 6/2022 | Tsiatsikas | ......... H04W 72/1236 |

* cited by examiner

| 0 | | | | | 31 |
|---|---|---|---|---|---|
| V | P | SUBTYPE | PT | LENGTH | |
| SSRC OF PACKET SOURCE | | | | | |
| SSRC OF MEDIA SOURCE | | | | | |
| EXP | | MANTISSA | | MEASURED OVERHEAD | |

310   320

| SDP offer |
|---|
| m=video 49154 RTP/AVP 99<br>a=tcap:1 RTP/AVPF<br>a=pcfg:1 t=1<br>b=AS:10000<br>b=RS:0<br>b=RR:2500<br>a=rtpmap:99 H265/90000<br>a=fmtp:99 profile-id=1; level-id=93;<br>a=imageattr:99 send [x=1920,y=1080] [x=1280,y=720] recv [x=1920,y=1080] [x=1280,y=720]<br>810 — a=3gpp_fisheye:99 fisheye=4 [id=1 azi ele til fov] [id=2 azi ele til fov] [id=3 azi ele til fov] [id=4 azi ele til fov]; maxpack=2;<br>a=sendrecv |

FIG.8A

| SDP offer |
|---|
| m=video 49154 RTP/AVP 99<br>...<br>820 — a=3gpp_fisheye:99 fisheye=4 [id=1 azi ele til fov] [id=2 azi ele til fov] [id=3 azi ele til fov] [id=4 azi ele til fov]; maxpack=2;<br>a=sendonly<br><br>m=video 49156 RTP/AVP 99<br>...<br>830 — a=3gpp_fisheye:99 maxpack=2;<br>a=recvonly |

FIG.8B

| V | P | SUBTYPE | PT | LENGTH |
|---|---|---|---|---|

| SSRC OF PACKET SOURCE |
|---|

| SSRC OF MEDIA SOURCE |
|---|

910 — | N | FISHEYE IMAGE IDs | — 920

| FISHEYE IMAGE IDs |
|---|

FIG.9

```
                    SDP offer
1010 ─ a=group:LS 1 2 3 4
       m=video 49154 RTP/AVP 99
       ...
       a=imageattr:99 send [x=1920,y=1080] [x=1280,y=720] recv [x=1920,y=1080]
       [x=1280,y=720]
       a=3gpp_fisheye:99 fisheye=4 [id=1 azi ele til fov]
       a=sendrecv
       a=mid:1
       m=video 49156 RTP/AVP 99
       ...
       a=imageattr:101 send [x=1920,y=1080] [x=1280,y=720] recv [x=1920,y=1080]
       [x=1280,y=720]
       a=3gpp_fisheye:101 fisheye=4 [id=2 azi ele til fov]
       a=sendrecv
       a=mid:2
       m=video 49158 RTP/AVP 99
       ...
       a=imageattr:103 send [x=1920,y=1080] [x=1280,y=720] recv [x=1920,y=1080]
       [x=1280,y=720]
       a=3gpp_fisheye:103 fisheye=4 [id=3 azi ele til fov]
       a=sendrecv
       a=mid:3
       m=video 49160 RTP/AVP 99
       ...
       a=imageattr:105 send [x=1920,y=1080] [x=1280,y=720] recv [x=1920,y=1080]
       [x=1280,y=720]
       a=3gpp_fisheye:105 fisheye=4 [id=4 azi ele til fov]
       a=sendrecv
       a=mid:4
```

FIG.10

METHOD AND APPARATUS FOR PROCESSING IMMERSIVE MEDIA

CROSS-REFERENCE TO RELATED APPLICATION(S)

This application is based on and claims priority under 35 U.S.C. § 119(a) of a Korean patent application number 10-2020-0115549, filed on Sep. 9, 2020, in the Korean Intellectual Property Office, and of a Korean patent application number 10-2021-0022121, filed on Feb. 18, 2021, in the Korean Intellectual Property Office, the disclosure of each of which is incorporated by reference herein in its entirety.

BACKGROUND

1. Field

The disclosure relates to media processing. More particularly, the disclosure relates to a method and an apparatus for processing an immersive media including 360-degree video.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Following the pursuit of high resolution video multimedia (SD, HD, UHD), the next immersive experience in multimedia was namely 360 video. By capturing 360 degrees, a user is able to view in any direction he or she desires whilst viewing content. Although still using traditional 2D video codecs for compression, the support of 360 video requires new technologies in the end-to-end workflow, including multi-camera configuration capture to capture the 360 scene, stitching technologies to create one continuous 360 video, new formats to support such stitched, as well as pre-stitched 360 videos, media processing technologies in order to reduce redundancy of such formats (such as region-wise packing), new delivery protocols and mechanisms in order to increase the efficiency of contents delivery (such as viewport dependent delivery).

Although there is much work and research on the streaming of 360 videos, conversational services for 360 videos have not been considered in much detail. By using the existing infrastructure in 5G for conversational multimedia services using IP Multimedia Subsystem (IMS), various forms of multimedia can be supported, albeit with additional parameters and procedures required for each new form of media and use case.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for negotiating parameter for fisheye image/video based on the Session Description Protocol (SDP) protocol.

Additional aspects will be set forth in part in the description which follows and, in part, will be apparent from the description, or may be learned by practice of the presented embodiments.

In accordance with an aspect of the disclosure, a method of a transmitting device is provided. The method includes transmitting, to a receiving device, a Session Description Protocol (SDP) offer message for negotiation of parameter associated with a fisheye image, and receiving, from the receiving device, a fisheye SDP answer message including second fisheye image related information generated based on first fisheye image related information included in the SDP offer message, wherein the first fisheye image related information includes first maximum packing information indicating a maximum number of fisheye images that is available to be packed into one stream.

In accordance with another aspect of the disclosure, a method of a receiving device is provided. The method includes receiving, from a transmitting device, a Session Description Protocol (SDP) offer message for negotiation of parameter associated with a fisheye image, generating a SDP answer message including second fisheye image related information, based on first fisheye image related information included in the SDP offer message and transmitting, to the transmitting device, the SDP answer message, wherein the first fisheye image related information includes first maximum packing information indicating a maximum number of fisheye images that is available to be packed into one stream.

In accordance with another aspect of the disclosure, a transmitting device is provided. The device includes a transceiver, and a controller configured to transmit, to a receiving device, a Session Description Protocol (SDP) offer message for negotiation of parameter associated with a fisheye image, and receive, from the receiving device, a SDP answer message including second fisheye image related information generated based on first fisheye image related information included in the SDP offer message, wherein the first fisheye image related information includes first maximum packing information indicating a maximum number of fisheye images that is available to be packed into one stream.

In accordance with another aspect of the disclosure, a receiving device is provided. The device includes a transceiver, and a controller configured to receive, from a transmitting device, a Session Description Protocol (SDP) offer message for negotiation of parameter associated with a fisheye image, generate a SDP answer message including second fisheye image related information, based on first fisheye image related information included in the SDP offer message, and transmit, to the transmitting device, the SDP answer message, wherein the first fisheye image related information includes first maximum packing information indicating a maximum number of fisheye images that is available to be packed into one stream.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A shows an example of an SDP offer according to an embodiment of the disclosure;

FIG. 8B shows an example of an SDP offer according to an embodiment of the disclosure;

FIG. 9 shows a structure of a Temporary Maximum Media Bit-Rate Request (TMMBR) message included in an RTCP according to an embodiment of the disclosure;

FIG. 10 shows an example of an SDP offer in the case of a multi-stream media session configuration according to an embodiment of the disclosure;

Throughout the drawings, it should be noted that like reference numbers are used to depict the same or similar elements, features, and structures.

DETAILED DESCRIPTION

Figure 1A:
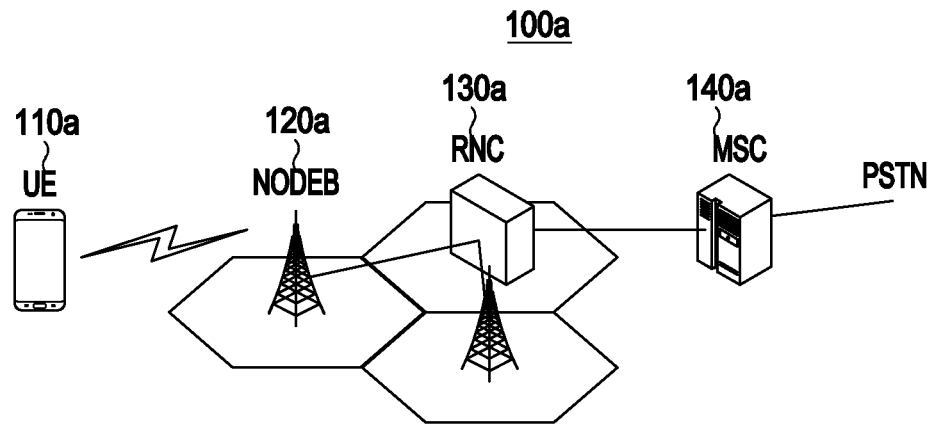
FIG. 1A shows a structure of a third generation (3G) network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments described herein are not necessarily mutually exclusive, as some embodiments can be combined with one or more other embodiments to form new embodiments.

The term "or" as used herein, refers to a non-exclusive "or", unless otherwise indicated.

The examples used herein are intended merely to facilitate an understanding of ways in which the embodiments of the disclosure can be practiced and to further enable those skilled in the art to practice the embodiments of the disclosure. Accordingly, the examples provided herein should not be construed as limiting the scope of the disclosure.

The disclosure may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the disclosure. Likewise, the blocks may be physically combined into more complex blocks without departing from the scope of the disclosure.

The "primary" floor participant, the "secondary" floor participant and the "tertiary" floor participant are merely used for labelling purposes.

The disclosure relates to multimedia content capturing, processing, pre-processing, post-processing, metadata delivery, delivery, decoding and rendering of fisheye 360 degree video contents, including fisheye image (e.g. fisheye circular image). In disclosure, fisheye image may refer to fisheye image video, fisheye video, 360-degree fisheye image video, or 360-degree fisheye video. In disclosure, fisheye circular image may refer to fisheye circular image video, fisheye circular video, 360-degree fisheye circular image video, or 360-degree fisheye circular video.

360 video is commonly consumed using head mounted devices (HMDs). However, due to the nature of the content, a user never sees the whole 360 video at once, but only the viewport which he or she is viewing at any given time. For this reason, a whole stitched 360 video requires a very high resolution in order for a viewport that 360 video to be high enough in quality for viewing. Even a stitched 360 video in 8K is insufficient to support a 4K viewport.

Due to the high resolution requirement for 360 video, there are many technologies which attempt to save bandwidth for delivery. Such mechanisms are effective for use in cases where the content is produced beforehand, since most solutions require both stitching of the video, as well as processing such as region-wise packing of the video, before its compression and encapsulation for streaming Whilst region-wise packing is effective at reducing redundancy, viewport-dependent delivery requires an accurate knowledge of the user's viewport, and also an accurate knowledge of the field of view contained by the different streams which have been region-wise packed for viewport dependent delivery.

Conversational services require a very low latency in order to support two way communication, and with the high quality 360 video mentioned above, this creates further challenges. Most cameras for capture 360 videos utilise fisheye lenses, thus outputting multiple fisheye circular images.

The disclosure introduces the delivery of fisheye circular image videos for conversational 360 video. By defining new parameters for SDP signalling, a receiver may request only the required fisheye images which are required for the rendering of the viewer's current viewport. Since the request is performed by the receiver, the sender has no requirement for knowing the viewport of the receiver constantly, thus saving both processing power and bandwidth.

The disclosure enables conversational 360 video delivery without the need for the receiver to send its viewport information to the sender constantly. Bandwidth is also saved by enabling the delivery of only a subset of fisheye circular images which are required by the receiver. Stitching (where needed) is performed by the receiving entity.

Additional aspects and advantages of the disclosure will be partially appreciated and become apparent from the descriptions below, or will be well learned from the practices of the disclosure.

FIG. 1A shows a structure of a 3G network according to an embodiment of the disclosure.

Referring to FIG. 1A, a 3G network 100a includes a User Equipment (UE) 110a, a NodeB (e.g., NodeB 120a), a Radio Network Controller (RNC) 130a, and a Mobile Switching Center (MSC) 140a. The 3G network 100a is connected to another mobile communication network and a public switched telephone network (PSTN). In such the 3G network 100a, voice is compressed/restored with an Adaptive Multi-Rate (AMR) codec, and the AMR codec is installed in a terminal (e.g., UE 110a) and MSC 140a to provide a two-way call service. The MSC 140a converts the voice compressed in the AMR codec into a Pulse Code Modulation (PCM) format and transmits it to the PSTN, or vice versa, transmits the voice in the PCM format from the PSTN, compresses it into the AMR codec, and transmits it to the base station (e.g., NodeB 120a). The RNC 130a can control the call bit rate of the voice codec installed in the UE 110a and MSC 140a in real time using the Codec Mode Control (CMC) message.

However, as a packet-switched network is introduced in 4G (LTE), the voice codec is installed only in the terminal, and the voice frame compressed at intervals of 20 ms is not restored at the base station or the network node located in the middle of the transmission path and is transmitted to the counterpart terminal.

Figure 1B:
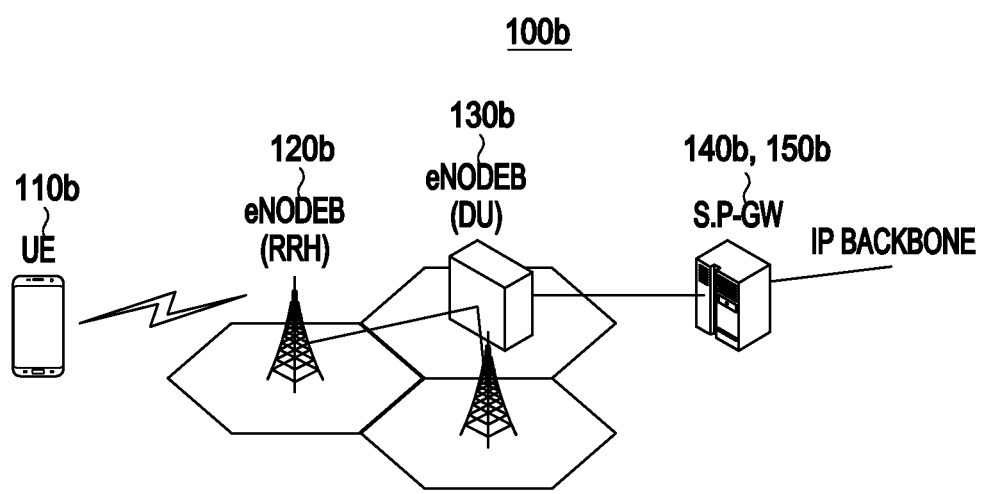
FIG. 1B shows a structure of a long term evolution (LTE) network according to an embodiment of the disclosure.

FIG. 1B shows a structure of a long term evolution (LTE) network according to an embodiment of the disclosure.

Referring to FIG. 1B, an LTE (4G) network 100b includes a User Equipment (UE) 110b, an eNodeB 120b, an eNodeB 130b, and Serving Gateway (S-GW) 140b/Packet Data Network Gateway (P-GW) 150b.

In an embodiment of FIG. 1B, the voice codec is installed only in the UE 110b, and each terminal (UE) can adjust the voice bit rate of the counterpart terminal using a Codec Mode Request (CMR) message.

In an embodiment of FIG. 1B, the eNodeB 120b, 130b, which is a base station, is divided into a Remote Radio Head (RRH) (e.g., eNodeB 120b) dedicated to RF functions and a Digital Unit (DU) (e.g., eNodeB 130b) dedicated to modem digital signal processing. The eNodeB 120b, 130b is connected to the IP backbone network through the S-GW 140b and P-GW 150b. The IP backbone network is connected to the mobile communication network or Internet of other service providers.

Figure 2A:
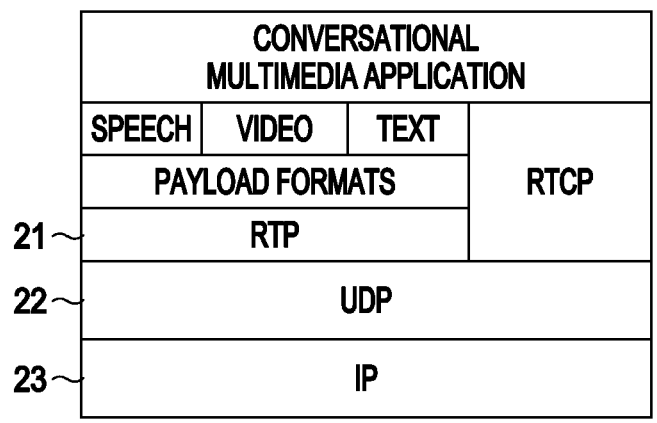
FIG. 2A shows a structure of a voice and video codec of a VoLTE supported terminal and a Real-time Transport Protocol (RTP)/User Datagram Protocol (UDP)/Internet Protocol (IP) protocol according to an embodiment of the disclosure.

FIG. 2A shows a structure of a voice and video codec of a VoLTE supported terminal and an Real-time Transport Protocol (RTP)/User Datagram Protocol (UDP)/Internet Protocol (IP) protocol according to an embodiment of the disclosure.

Referring to FIG. 2A, an IP protocol 23 located at the bottom of this structure is connected to the Packet Data Convergence Protocol (PDCP) located at the top of the protocol structure. In an embodiment of FIG. 2A, a media data (e.g. speech, video, text) is transmitted through RTP protocol 21/UDP protocol 22/IP protocol 23. The RTP/UDP/IP header is attached to the compressed media frame (media data) in the voice and video codec and transmitted to the counterpart terminal through the LTE network. In addition, the counterpart terminal receives the media packet (media data) compressed and transmitted from the network, restores the media, listens to the speaker and the display, and views the media. At this time, even if the compressed voice and video packet do not arrive at the same time, the Timestamp information of the RTP protocol header is used to synchronize the two media to listen and watch.

Figure 2B:
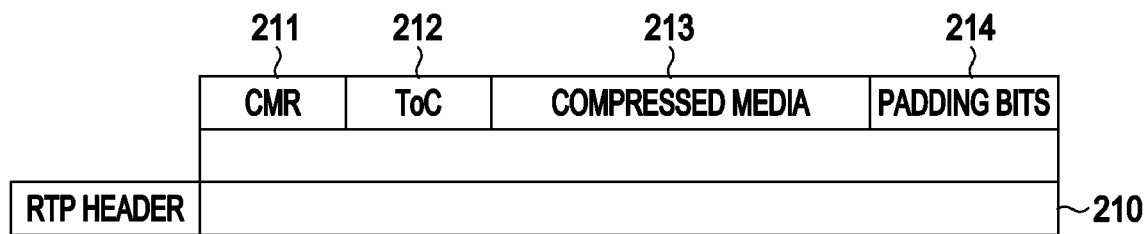
FIG. 2B shows a Codec Mode Request (CMR) message according to an embodiment of the disclosure.

FIG. 2B shows a CMR message according to an embodiment of the disclosure.

Referring to FIG. 2B, a CMR message may be a message used for adjusting a bit rate in which a counterpart terminal compresses a voice according to a change in a transmission state during a call.

Referring to FIG. 2A, a part at a top of FIG. 2A corresponds to a Payload format 210 and includes Codec Mode Request (CMR) field 211, Table of Contents (ToC) field 212, compressed media field 213 including compressed media data and/or padding bits field 214 including padding bits.

In an embodiment of FIG. 2B, a 4-bit CMR field 211 is added to the compressed voice frame (compressed media data) in the voice codec indicated by Speech to display a bit rate requested to be used by the voice codec of the counterpart terminal, and a 4-bit ToC field is added thereto to indicate the bit rate and type of the frame (media data) compressed and transmitted. VoLTE supports voice codecs such as Adaptive Multi-Rate (AMR), Adaptive Multi-Rate Wideband (AMR-WB), and Enhanced Voice Services (EVS).

The CMR message may also be transmitted through the RTP Control Protocol (RTCP) protocol in addition to the Payload protocol.

Figures 3, 4:
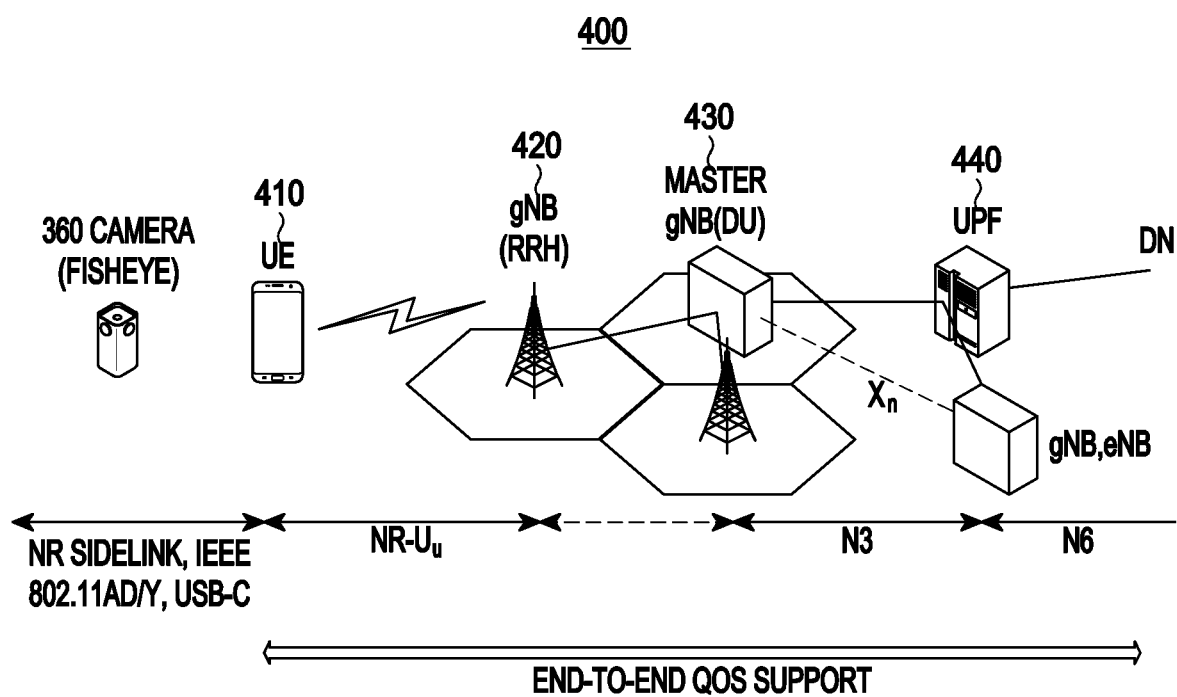
FIG. 3 shows a structure of a Temporary Maximum Media Bit-Rate Request (TMMBR) message according to an embodiment of the disclosure.
FIG. 4 shows a structure a 5G network for transmitting fisheye circular image videos according to an embodiment of the disclosure.

FIG. 3 shows a structure of a Temporary Maximum Media Bit-Rate Request (TMMBR) message according to an embodiment of the disclosure.

Referring to FIG. 3, a TMMBR message may be included in a RTCP during a call to dynamically adjust the bit rate of an image codec installed in a counterpart terminal. In an embodiment, the TMMBR message includes Exp field 310 indicating a value of the Exp and Mantissa field 320 indicating a value of the Mantissa. The UE that receives this message maintains the bit rate of the compressed image below Mantissa×2Exp bps based on Exp field 310 and Mantissa field 320. This value should be equal to or less than the bit rate negotiated before starting the video call.

FIG. 4 shows a structure a 5G network for transmitting fisheye circular image videos according to an embodiment of the disclosure.

Referring to FIG. 4, a fisheye circular image may be captured and generated by a 360 camera.

Referring to FIG. 4, a 5G network 400 may include a User Equipment (UE) 410, a gNodeB (gNB) 420, 430 and User Plane Function (UPF) 440. In an embodiment, UE 410 may be connected with 360 camera.

The 5G nodes corresponding to the eNodeB, S-GW, and P-GW of LTE are gNB 420, 430, UPF 440, and Data Network (DN). The fisheye circular image videos may be transmitted through the Sidelink or Wi-Fi Direct of LTE, 5G using an unlicensed frequency band without passing through the base station (gNB) or directly to the terminal via a USB-C cable. When USB-C is used, a large amount of data can be transmitted at a low rate without error, the videos can be compressed on the terminal rather than the camera.

Figure 5:
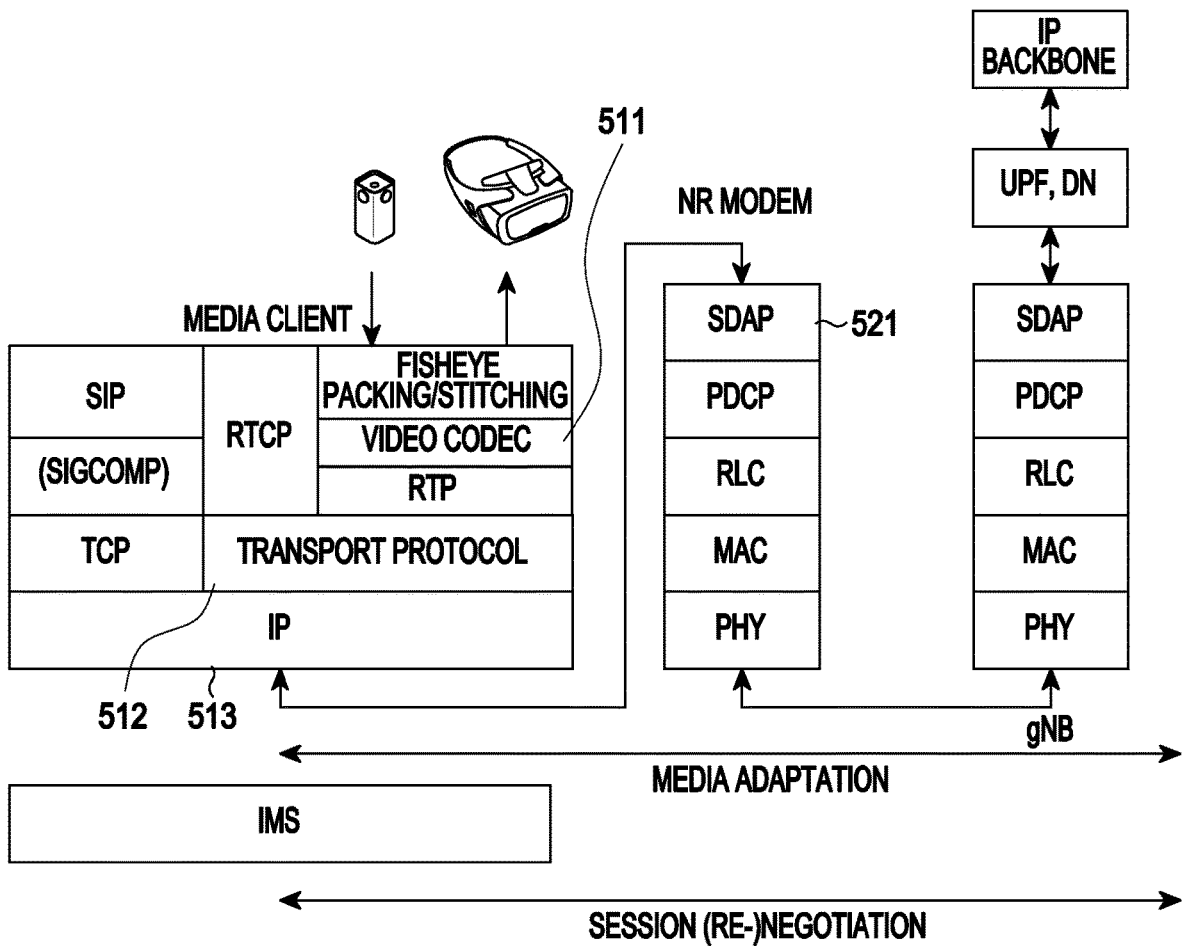
FIG. 5 shows a protocol architecture of a 5G network for transmitting fisheye circular image videos according to an embodiment of the disclosure.

FIG. 5 shows a protocol architecture of a 5G network for transmitting fisheye circular image videos according to an embodiment of the disclosure.

Referring to FIG. 5, a fisheye circular image videos may be a fisheye circular image/video arrived at a transmitting terminal (device). In an embodiment, the transmitting terminal (device) may be the UE 410 of FIG. 4.

The fisheye circular image videos from the camera are packed according to the requirements negotiated between the sender and receiver, and it is subsequently compressed using a video codec 511 (such as AVC or HEVC), and is delivered using various transport protocols 512 such as RTP and the Internet protocol 513, which includes the address of a receiving terminal, and is transmitted to a 5G New Radio (NR) modem and transmitted to a receiving terminal via uplink. Unlike the protocol structure of the LTE modem, the NR modem has a new protocol called Service Data Adaptation Protocol (SDAP) 521 located at the top of the PDCP.

The receiving terminal recovers the payload that has removed the headers of each protocol in the form of a compressed video stream which is fed into a video decoder, and then it is stitched (if necessary), and is projected onto a 3D sphere model, and the view matching the user's current viewport is rendered on the display such as a head mounted display (HMD) connected to the receiving terminal. The HMD may also not be connected to the terminal but may be connected directly to the mobile communication network using its own communication function.

Figure 6A:
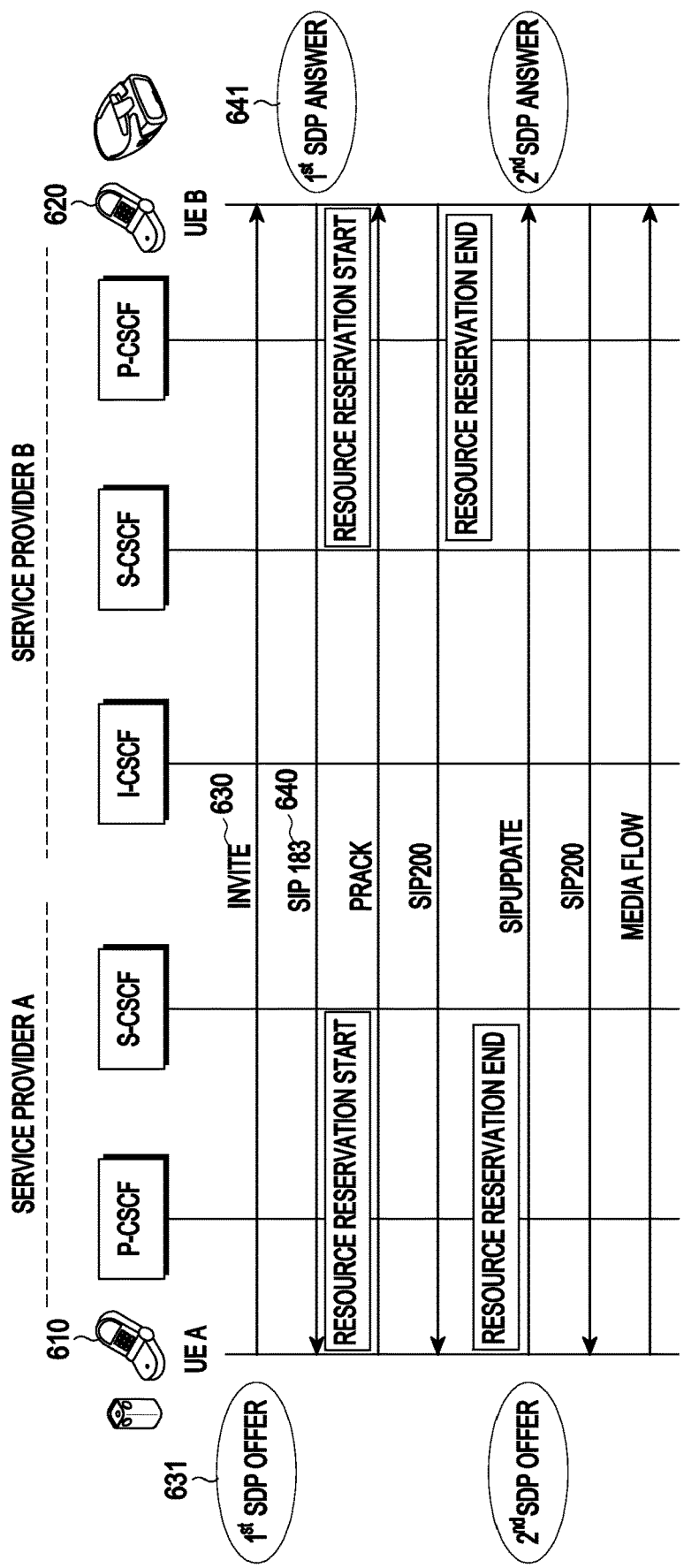
FIG. 6A shows a procedure for a transmitting terminal (UE A) and a receiving terminal (UE B) to negotiate a transmission method/parameter of a fisheye camera based 360 degree video using an IP multimedia subsystem and to secure an QoS of a wired and wireless transmission path according to an embodiment of the disclosure.

FIG. 6A shows a procedure for a transmitting terminal (UE A) and a receiving terminal (UE B) to negotiate a transmission method/parameter of a fisheye camera based 360 video using an IP multimedia subsystem and to secure a QoS of a wired and wireless transmission path according to an embodiment of the disclosure.

Referring to FIG. 6A, an IP multimedia subsystem (IMS) may be an IMS as shown in FIG. 5. In an embodiment of FIG. 6A, the transmitting terminal (UE A) 610 and the receiving terminal (UE B) 620 may perform a negotiation of parameter for a fisheye image/video (e.g. 360-degree fisheye circular image/video) using a SDP message (SDP offer message 631/SDP answer message 641). In other words, the SDP-based negotiation may be performed to negotiate parameter(s) for the fisheye image/video between the transmitting terminal (UE A) 610 and the receiving terminal (UE B) 620.

Referring to FIG. 6A, a transmitting terminal (UE A) 610 may transmit a SDP request message (SDP offer message) 631 to a Proxy Call Session Control Function (P-CSCF), which has an IMS node allocated to UE A 610, in a (SIP) Invite message 630 shown in FIGS. 8A and 8B. This message may be transmitted to the IMS connected to the counterpart terminal through nodes such as Session Call Session Control Function (S-CSCF) and Interrogating Call Session Control Function (I-CSCF) and finally to the receiving terminal (UE B) 620.

The receiving terminal (UE B) 620 may select an acceptable bit rate and the transmission method from among the bit rates proposed by the transmitting terminal (UE A) 610. The receiving terminal (UE B) 620 may also select a desired configuration of fisheye circular images/videos according to that offered by the sending/transmitting terminal (UE A) 610, including this information in an SDP answer message 641 in the SIP 183 message 640 in order to transmit the SDP answer message 641 to the transmitting terminal (UE A) 610. In the process of transmitting the SDP answer message 641 to the transmitting terminal (UE A) 610, each IMS node may start to reserve transmission resources of the wired and/or wireless networks required for this service, and all the conditions of a session including point cloud transmission may be agreed through additional procedures. The transmitting terminal (UE A) 610 may confirm that the transmission resources of all transmission sections may be secured and transmit the 360 fisheye image videos/images to the receiving terminal (UE B) 620.

Figure 6B:
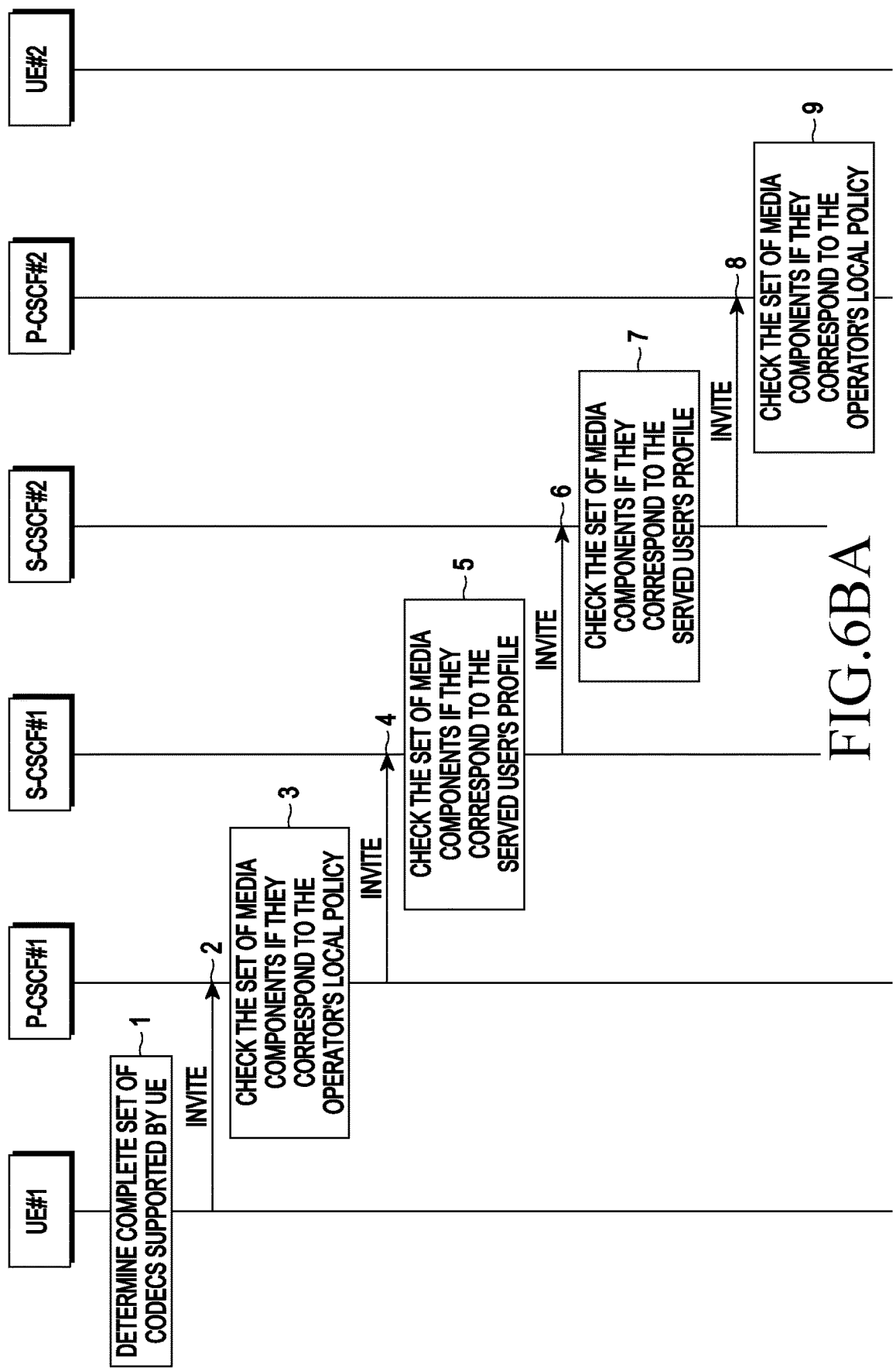
FIGS. 6BA and 6BB show a procedure of the receiving terminal for establishing an SDP answer from an SDP offer transmitted by the transmitting terminal according to various embodiments of the disclosure.
Figure 6B:
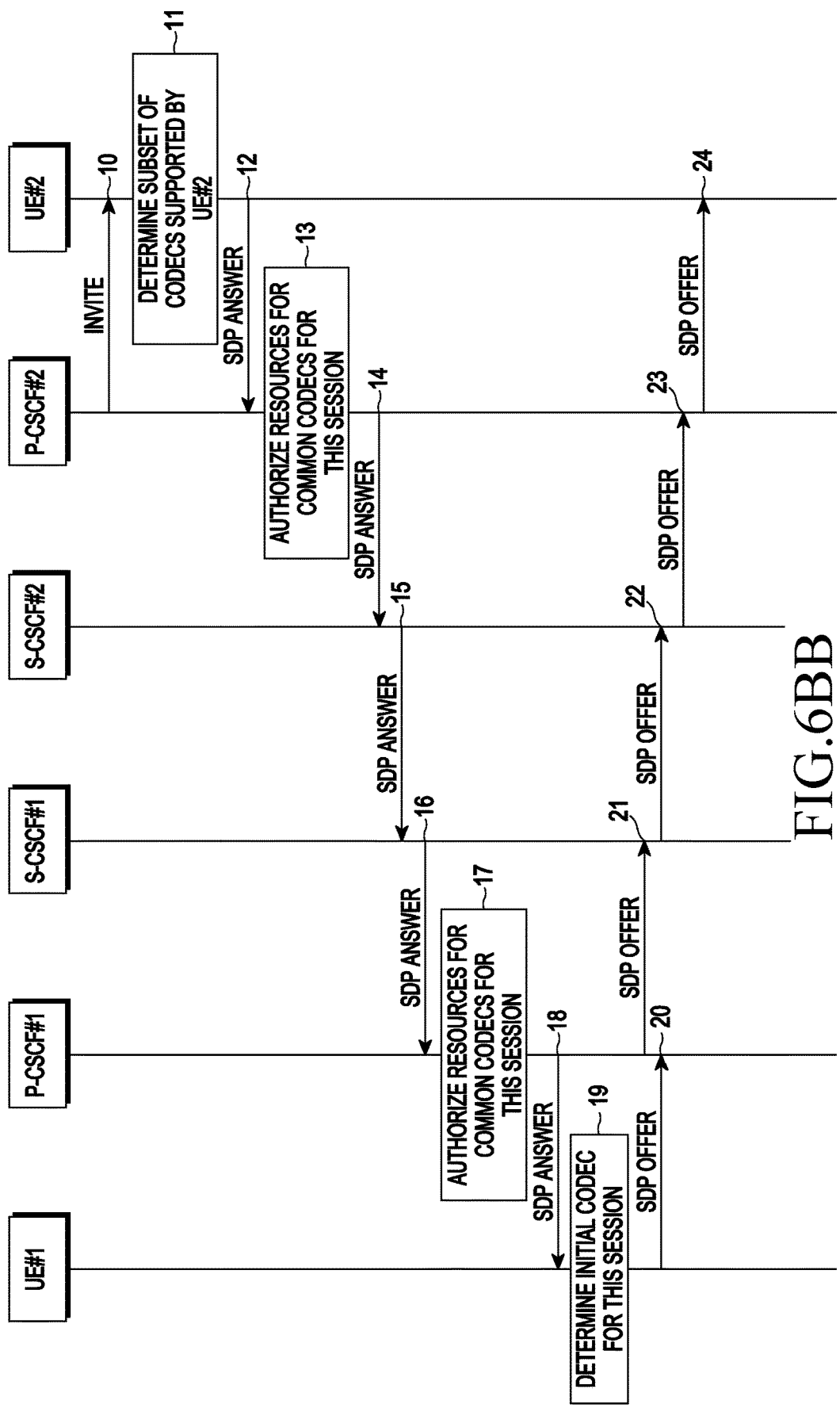

FIGS. 6BA and 6BB show a procedure of a receiving terminal for establishing an SDP answer from an SDP offer transmitted by a transmitting terminal according to various embodiments of the disclosure.

Referring to FIGS. 6BA and 6BB, a transmitting terminal may refer to a UE #1 and a receiving terminal may refer to a UE #2.

The detailed procedure may be as follows:

In operation 1, UE #1 determines and inserts the codec (s)/fisheye related parameter(s) to a SDP payload. The inserted codec(s)/fisheye related parameter(s) shall reflect the UE #1's terminal capabilities and user preferences for the session capable of supporting for this session. The UE #1 builds a SDP (SDP offer) containing bandwidth requirements and characteristics of each, and assigns local port numbers for each possible media flow. Multiple media flows may be offered, and for each media flow (m=line in SDP), there may be multiple codec/fisheye related parameter choices offered.

In operation 2, UE #1 sends the initial INVITE message to P-CSCF #1 containing this SDP In operation 3, P-CSCF #1 examines the media parameters (components). If P-CSCF #1 finds media parameters not allowed to be used within an IMS session (based on P-CSCF local policies, or (if available) bandwidth authorization limitation information coming from the PCRF/PCF), it rejects the session initiation attempt. This rejection shall contain sufficient information for the originating UE (e.g. UE #1) to re-attempt session initiation with media parameters that are allowed by local policy of P-CSCF #1's network according to the procedures specified in IETF RFC 3261 [12].
In this flow described in FIGS. 6BA and 6BB, the P-CSCF #1 allows the initial session initiation attempt to continue.
NOTE 1: Whether the P-CSCF should interact with PCRF/PCF in this operation is based on operator policy.

In operation 4, P-CSCF #1 forwards the INVITE message to S-CSCF #1

In operation 5, S-CSCF #1 examines the media parameters (components). If S-CSCF #1 finds media parameters that local policy or the originating user's subscriber profile does not allow to be used within an IMS session, it rejects the session initiation attempt. This rejection shall contain sufficient information for the originating UE to re-attempt session initiation with media parameters that are allowed by the originating user's subscriber profile and by local policy of S-CSCF #1's network according to the procedures specified in IETF RFC 3261 [12].
In this flow described in FIGS. 6BA and 6BB, the S-CSCF #1 allows the initial session initiation attempt to continue.

In operation 6, S-CSCF #1 forwards the INVITE message, through the S-S Session Flow Procedures, to S-CSCF #2

In operation 7, S-CSCF #2 examines the media parameters (components). If S-CSCF #2 finds media parameters that local policy or the terminating user's (e.g. UE #2) subscriber profile does not allow to be used within an IMS session, it rejects the session initiation attempt. This rejection shall contain sufficient information for the originating UE to re-attempt session initiation with media parameters that are allowed by the terminating user's subscriber profile and by local policy of S-CSCF #2's network according to the procedures specified in IETF RFC 3261 [12].
In this flow described in FIGS. 6BA and 6BB, the S-CSCF #2 allows the initial session initiation attempt to continue.

In operation 8, S-CSCF #2 forwards the INVITE message to P-CSCF #2.

In operation 9, P-CSCF #2 examines the media parameters (components). If P-CSCF #2 finds media parameters not allowed to be used within an IMS session (based on P-CSCF local policies, or (if available) bandwidth authorization limitation information coming from the PCRF/PCF), it rejects the session initiation attempt. This rejection shall contain sufficient information for the originating UE to re-attempt session initiation with media parameters that are allowed by local policy of P-CSCF #2's network according to the procedures specified in IETF RFC 3261 [12].
In this flow described in FIGS. 6BA and 6BB, the P-CSCF #2 allows the initial session initiation attempt to continue.
NOTE 2: Whether the P-CSCF should interact with PCRF/PCF in this operation is based on operator policy.

In operation 10, P-CSCF #2 forwards the INVITE message to UE #2

In operation 11, UE #2 determines the complete set of codecs/fisheye related parameters that it is capable of supporting for this session. It determines the intersection with those appearing in the SDP (SDP offer) in the INVITE message. For each media flow that is not supported, UE #2 inserts a SDP entry for media (m=line) with port=0. For each media flow that is supported, UE #2 inserts a SDP entry with an assigned port and with the codecs/fisheye related parameters in common with those in the SDP from UE #1.

In operation 12, UE #2 returns the SDP Answer (SDP response/SDP offer) listing common media flows and codecs/fisheye related parameters to P-CSCF #2

In operation 13, P-CSCF #2 authorizes the QoS resources for the remaining media flows and codec/fisheye related parameter choices.

In operation 14, P-CSCF #2 forwards the SDP response/ answer to S-CSCF #2.

In operation 15, S-CSCF #2 forwards the SDP response/ answer to S-CSCF #1

In operation 16, S-CSCF #1 forwards the SDP response/ answer to P-CSCF #1

In operation 17, P-CSCF #1 authorizes the QoS resources for the remaining media flows and codec/fisheye related parameter choices.

In operation 18, P-CSCF #1 forwards the SDP response/answer to UE #1

In operation 19, UE #1 determines which media flows should be used for this session, and which codecs/fisheye related parameters should be used for each of those media flows. If there was more than one media flow, or if there was more than one choice of codec/fisheye related parameter for a media flow, then UE #1 need to renegotiate the codecs/fisheye related parameters by sending another offer to reduce codec/fisheye related parameter to one with the UE #2.

In operation 20-24. UE #1 sends the "Offered SDP" message to UE #2, along the signaling path established by the INVITE request The remainder of the multi-media session completes identically to a single media/single codec session, if the negotiation results in a single codec per media.

Figure 7A:
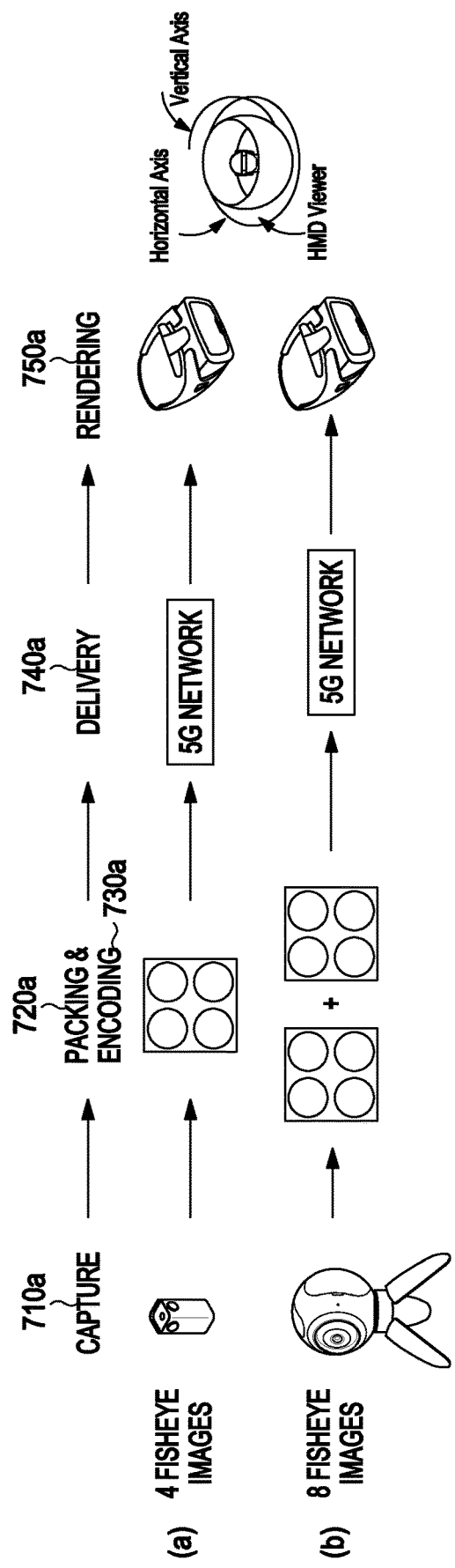
FIG. 7A shows a media workflow for 360 degree fisheye video according to an embodiment of the disclosure.

FIG. 7A shows a media workflow for 360 fisheye video according to an embodiment of the disclosure.

Referring to FIG. 7A, a number of different fisheye circular images (360-degree fisheye video) are captured (710a) by a 360 video (for example, 4 as shown in (a) of FIG. 7A or 8 as shown in (b) of FIG. 7A).

Referring to FIG. 7A, this fisheye circular image videos may be packed (720a) into various stream configurations before encoded (730a) by a video encoder. In an e embodiment, the transmitting terminal may pack a plurality of the fisheye circular image/videos (360 degree fisheye video) into a single media stream (a single image frame/picture) and encode/compress the packed fisheye circular image/videos to generate a compressed/encoded 360 degree fisheye video bitstreams.

The compressed/encoded 360 degree fisheye video bitstreams may be then delivered (740a) via a communication network (e.g. 5G network) as described in the FIG. 7A, and received by a receiving terminal. At the receiving terminal, the compressed bitstream may be uncompressed, stitched (if necessary). And then the desired field of view for the user's current viewport may be rendered (750a) on a display such as a head mounted display (HMD).

Figure 7B:
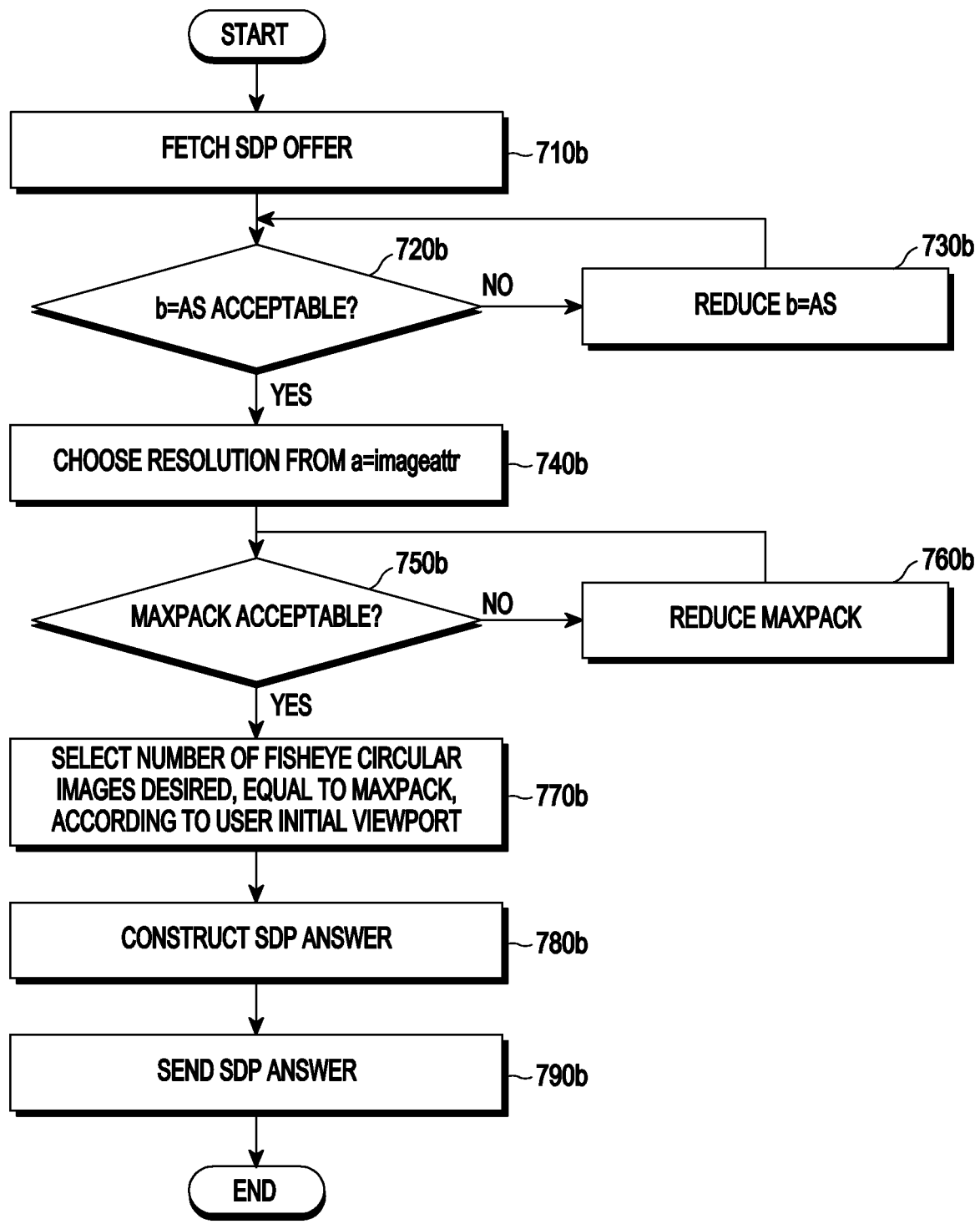
FIG. 7B shows a process in which a receiving terminal analyses an SDP Offer transmitted by a transmitting terminal and creates and transmits the SDP Answer according to an embodiment of the disclosure.

FIG. 7B shows a process in which a receiving terminal analyses a SDP Offer transmitted by a transmitting terminal and creates and transmits a SDP Answer according to an embodiment of the disclosure.

In an embodiment of FIG. 7B, a receiving terminal may receive an SDP Offer transmitted by a transmitting terminal according to, for example, a procedure as shown in the FIG. 6A or FIGS. 6BA and 6BB.

Referring to FIG. 7B, in operation 710b, a receiving terminal may fetch an SDP offer.

In operation 720b, the receiving terminal may receive/obtain b=AS in the SDP Offer and determine whether the b=AS is acceptable. In an embodiment, the receiving terminal may determine whether the b=AS is acceptable by comparing a value of the b=AS with the maximum bit rate value allowed to the receiving terminal. Here, b=AS means a bandwidth attribute for application specific (AS). In an embodiment, b=AS in the SDP offer may indicate the maximum bandwidth related to the corresponding media (application) specified by the transmitting terminal.

If the value of the b=AS is unacceptable by comparing it with the maximum bit rate value allowed to the receiving terminal, in operation 730b, the receiving terminal may reduce the value and in operation 720b, the receiving terminal may determine whether the reduced value is acceptable.

If the value of the b=AS is acceptable, in operation 740b, the receiving terminal may select an appropriate resolution based on this value (the accepted value).

In operation 750b, the receiving terminal may determine whether the maxpack value is acceptable. The maxpack value in the SDP offer represents the maximum number of fisheye images/videos which can be packed into the single frame picture (single frame/single stream) sent via the associated media stream (video stream), as supported by the sending/transmitting terminal. Depending on the requirements of the receiving terminal, either because of processing limitations or playback configurations (such as fisheye image resolution, stitching capabilities etc), the receiving terminal may select a value of maxpack which is lower than or equal to a value of maxpack specified in the SDP offer (the minimum value for maxpack is 1).

If the value of the maxpack is unacceptable, in operation 760b, the receiving terminal may reduce the value, and in operation 750b, the receiving terminal may determine whether the reduced value is acceptable. If the value of the maxpack is acceptable, the accepted value may be decided/selected a value of the maxpack for the receiving terminal.

Once maxpack is decided/selected, in operation 770b, the receiving terminal may select a number of fisheye images/videos corresponding to the number decided by maxpack. In an embodiment, the fisheye images/videos selected may correspond to the initial viewport of the viewer (user). In an embodiment, the fisheye images/videos may be selected using the identifiers as listed in the SDP offer received.

In operation 780b, the receiving terminal may construct/generate the SDP answer. In an embodiment, the SDP answer may include information for the maxpack selected by the receiving terminal and/or information for the fisheye images/videos selected by the receiving terminal.

In operation 790b, the receiving terminal may transmit the SDP answer to the transmitting terminal.

Various examples of the above-described SDP offer/answer will be described below with reference to FIGS. 8A, 8B, and 10.

FIG. 8A shows an example of an SDP offer according to an embodiment of the disclosure.

Referring to FIG. 8A, an SDP offer may be a SDP offer (SDP offer message) by a transmitting terminal in the case of a single stream media session configuration.

Referring to FIG. 8A, an SDP offer may include a SDP attribute 3gpp_fisheye (a=3gpp_fisheye) 810 in the media description (e.g. m=lines) in an SDP offer. Hereinafter, an operation for identifying a fisheye image/video (or, 360-degree fisheye video stream) based on the SDP attribute 3gpp_fisheye 810 and parameters (360-degree fisheye video SDP attribute parameters) included in the SDP attribute 3gpp_fisheye 810 will be described.

Embodiment 1: Identifying the 360-Degree Fisheye Video Stream

The SDP attribute 3gpp_fisheye may be used to indicate/identify a 360-degree fisheye video stream.

The semantics of the above attribute and parameters may be provided below.

Immersive Teleconferencing and Telepresence for Remote Terminals (ITT4RT) (sending and receiving) clients supporting 360-degree fisheye video/image shall support the 3gpp_fisheye attribute and shall support the following procedures:

when sending an SDP offer, the ITT4RT-Tx (sending) client includes the 3gpp_fisheye attribute in the media description for video in the SDP offer when sending an SDP answer, the ITT4RT-Rx (receiving) client includes the 3gpp_fisheye attribute in the media description for video in the SDP answer if the 3gpp_fisheye attribute was received in an SDP offer after successful negotiation of the 3gpp_fisheye attribute in the SDP, the Multimedia Telephony Service for IMS (MTSI) clients exchange an RTP-based video stream containing an HEVC or AVC bitstream with fisheye omnidirectional video specific SEI messages as defined in HEVC or AVC specifications, respectively.

ITT4RT-Tx (sending) clients that support both 360-degree projected video and 360-degree fisheye video may include both 3gpp_360video and 3gpp_fisheye attributes as alternatives in the SDP offer, but an ITT4RT-Rx (receiving) client shall include only one attribute (either 3gpp_360video or 3gpp_fisheye, based on support or selection) in the SDP answer.

In the disclosure, ITT4RT is MTSI client supporting the ITT4RT feature. ITT4RT-Tx client is ITT4RT client only capable of sending immersive video. ITT4RT-Rx client is ITT4RT client only capable of receiving immersive video. MTSI client is a function in a terminal or in a network entity (e.g. a Media Resource Function Processor (MRFP)) that supports MTSI.

Embodiment 2: 360-Degree Fisheye Video SDP Attribute Parameters

Media-line level parameters are defined in order to aid session establishment between the ITT4RT-Tx (sending) and ITT4RT-Rx (receiving) clients for 360-degree fisheye video, as well as to describe the fisheye video stream as identified by the 3gpp_fisheye attribute.

Total Number of Fisheye Circular Videos at the Capturing Terminal

Depending on the camera configuration of the sending terminal, the 360-degree fisheye video may be comprised of multiple different fisheye circular videos, each captured through a different fisheye lens.

<fisheye>: this parameter inside an SDP offer sent by an ITT4RT-Tx (sending) client indicates the total number of fisheye circular videos output by the camera configuration at the terminal (e.g., capturing terminal)

Fisheye Circular Video Static Parameters

In order to enable the quick selection of desired fisheye circular videos by the ITT4RT-Rx (receiving) client during SDP negotiation, the following static parameters are defined for each fisheye circular video. These parameters are defined from the video bitstream fisheye video information SEI message as defined in ISO/IEC 23008-2 [119] and ISO/IEC 23090-2 [R1].

<fisheye-img>=<fisheye-img-1> . . . <fisheye-img-N>
<fisheye-img-X>=[<id-X> <azi> <ele> <til> <fov>] for $1 \leq X \leq N$ where:

<id>: an identifier for the fisheye video

<azi>, <ele>: azimuth and elevation indicating the spherical coordinates that correspond to the centre of the circular region that contains the fisheye video, in units of $2^{-16}$ degrees. The values for azimuth shall be in the range of $-180*2^{16}$ (i.e., −11 796 480) to $180*2^{16}-1$ (i.e., 11 796 479), inclusive, and the values for elevation shall be in the range of $-90*2^{16}$ (i.e., −5 898 240) to $90*2^{16}$ (i.e., 5 898 240), inclusive <til>: tilt indicating the tilt angle of the sphere regions that corresponds to the fisheye video, in units of $2^{-16}$ degrees. The values for tilt shall be in the range of $-180*2^{16}$ (i.e., −11 796 480) to $180*2^{16}-1$ (i.e., 11 796 479), inclusive <fov>: specifies the field of view of the lens that corresponds to the fisheye video in the coded picture, in units of $2^{-16}$ degrees. The field of view shall be in the range of 0 to $360*2^{16}$ (i.e., 23 592 960), inclusive Stream Packing of Fisheye Circular Videos Depending on the terminal device capabilities and bandwidth availability, the packing of fisheye circular videos within the stream can be negotiated between the sending and receiving terminals.

<maxpack>: this parameter inside an SDP offer indicates the maximum supported number of fisheye videos which can be packed into the video stream by the ITT4RT-Tx client. The value of this parameter inside an SDP answer indicates the number of fisheye videos to be packed, as selected by the ITT4RT-Rx client.

The ABNF syntax for this attribute may be the following:

Embodiment 2-1 (in a first embodiment (embodiment 2-1a), <fisheye> is included as mandatory in the SDP offer, and number of <fisheye-img-X> is always equal to <fisheye>; in a second embodiment (embodiment 2-1b), <fisheye> is present in the SDP offer only when the number of <fisheye-img-X> is not equal to <fisheye>)

The syntax for the SDP attribute is:
a=3gpp_fisheye: <maxpack> <fisheye> <fisheye-img>
fisheye-attrib="a=3gpp_fisheye:" SP maxpack [SP fisheye] SP fisheye-img
maxpack=integer
fisheye=integer
fisheye-img=[fisheye]fisheye-img-X
fisheye-img-X="[" "id=" idvalue "," "azi=" azivalue "," "ele=" elevalue "," "til=" tilvalue "," "fov=" fovvalue "]"
idvalue=byte-string; byte-string defined by RFC 4566
azivalue=["−"]POS-DIGIT *7DIGIT/"0"
elevalue=["−"]POS-DIGIT *6DIGIT/"0"
tilvalue=["−"]POS-DIGIT *7DIGIT/"0"
fovvalue=POS-DIGIT *7DIGIT/"0"
POS-DIGIT=% x31-39; 1-9
integer=POS-DIGIT *DIGIT Embodiment 2-2 (in this embodiment, <fisheye> is included as mandatory in the SDP offer, number of <fisheye-img-X> indicates number of fisheye videos in the video stream associated with this 3gpp_fisheye attribute and can equal or be less than <fisheye>)

The syntax for the SDP attribute is:
a=3gpp_fisheye: <maxpack> <fisheye> <fisheye-img>
fisheye-attrib="a=3gpp_fisheye:" SP maxpack SP fisheye SP fisheye-img
maxpack=integer
fisheye=integer
fisheye-img=1*fisheye-img-X
fisheye-img-X="[" "id=" idvalue "," "azi=" azivalue "," "ele=" elevalue "," "til=" tilvalue "," "fov=" fovvalue "]"
idvalue=byte-string; byte-string defined by RFC 4566
azivalue=["−"]POS-DIGIT *7DIGIT/"0"
elevalue=["−"]POS-DIGIT *6DIGIT/"0"
tilvalue=["−"]POS-DIGIT *7DIGIT/"0"
fovvalue=POS-DIGIT *7DIGIT/"0"
POS-DIGIT=% x31-39; 1-9
integer=POS-DIGIT *DIGIT Embodiment 2-3 (in this embodiment, <fisheye> is not signalled, number of <fisheye-img-X> indicates number of fisheye videos in the video stream associated with this 3gpp_fisheye attribute and implicitly indicates the value of <fisheye>)

The syntax for the SDP attribute is:
a=3gpp_fisheye: <maxpack> <fisheye-img>
fisheye-attrib="a=3gpp_fisheye:" SP maxpack SP fisheye-img
maxpack=integer
fisheye-img=1*fisheye-img-X
fisheye-img-X="[" "id=" idvalue "," "azi=" azivalue "," "ele=" elevalue "," "til=" tilvalue "," "fov=" fovvalue "]"
 idvalue=byte-string; byte-string defined by RFC 4566
 azivalue=["–"]POS-DIGIT *7DIGIT/"0"
 elevalue=["–"]POS-DIGIT *6DIGIT/"0"
 tilvalue=["–"]POS-DIGIT *7DIGIT/"0"
 fovvalue=POS-DIGIT *7DIGIT/"0"
 POS-DIGIT=% x31-39; 1-9
 integer=POS-DIGIT *DIGIT The <fisheye> attribute may be omitted in an SDP answer.

An example SDP offer is shown in FIG. 8A, conformant to the syntax for embodiments 2-1 and 2-2.

As an example, a receiving terminal which only receives 360-degree fisheye video (and possibly sends a 2D video to the sender) replies with an SDP answer containing only the selected fisheye videos equal to the number as selected by the value of maxpack in the corresponding m-line, which is set to recvonly.

FIG. 8B is an example of an SDP offer according to an embodiment of the disclosure.

Referring to FIG. 8B, an SDP offer may be a SDP offer (SDP offer message) including a fisheye video.

In the embodiment of FIG. 8B, it is assumed that 4 fisheye images/videos can be captured.

Referring to FIG. 8B, the SDP offer may include a first media description (m=lines #1) corresponding to a=sendonly and a second media description (m=lines #2) corresponding to a=recvonly. The first media description may include a first SDP attribute 3gpp_fisheye (a=3gpp_fisheye) 820 and the second media description may include a second SDP attribute 3gpp_fisheye (a=3gpp_fisheye) 830.

Referring to FIG. 8B, for media corresponding to a=sendonly, although 4 fisheye images/videos can be captured, it is proposed that the transmitting terminal may pack and transmit up to 2 fisheye images/video into a single stream (e.g. video stream). Similarly, for media corresponding to a=recvonly, it is proposed that the transmitting terminal may receive up to 2 fisheye images/video packed into a single stream by the receiving terminal. But since the transmitting terminal cannot know the characteristics of the lens to capture the fisheye image at the receiving terminal, <fisheye> and <fisheye-img-X> parameters may be omitted in the SDP offer. A method of generating an SDP answer when the receiving terminal receives the SDP offer illustrated in FIG. 8B may be as follows.

1. Case 1 in which fisheye video/image is not supported at the receiving terminal: the receiving terminal may signal not to receive fisheye video/image as in normal SDP media negotiation (e.g. set port number to 0)

2. Case 2 in which the receipt of fisheye video/image is supported and the characteristics of the receiving terminal's fisheye image/video processing and rendering capabilities are the same as the characteristics in the SDP offer: the receiving terminal may select up to two of the four <fisheye-img-X> parameters provided in the SDP offer and include information related to this selection in the SDP answer, setting the corresponding m=line to reconly. The number of <fisheye-img-X> parameters selected may also depend on the receiving terminal's bandwidth availability. The selected <fisheye-img-X> parameters typically match the field of view desired by the receiving terminal, according to the user's viewport. For example, the receiving terminal may select and include one or two <fisheye-img-X> parameters in the SDP answer. In this case, the <maxpack> parameter in the SDP answer is set to 1 or 2, accordingly.

3. Case 3 in which both the send and receipt of fisheye video/image is supported but the characteristics of the camera/lens to capture the fisheye image (or its processing capabilities) at the receiving terminal are different from the characteristics in the SDP offer: the receiving terminal replies with two fisheye video media lines (m=) set as a=sendonly and a=recvonly in the SDP answer.

In one embodiment, for the media line (Fisheye video media line) set as a=recvonly, the receiving terminal may select up to two of the four <fisheye-img-X> parameters provided in the SDP offer and include information related to this selection in the SDP answer as exemplified in Case 2. In this case, the <maxpack> parameter in the SDP answer may be set to 2 or 1.

In another embodiment, for the media line set as a=sendonly, the receiving terminal may describe the media line (or, SDP attribute 3gpp_fisheye) in the SDP answer by considering its processing capability and camera/lens parameters of (the transmitting terminal). In this case, additional SDP exchange may be required for negotiation of the media line set as a=sendonly of the SDP answer sent by the receiving terminal.

FIG. 9 shows a structure of a Temporary Maximum Media Bit-Rate Request (TMMBR) message according to an embodiment of the disclosure.

Referring to FIG. 9, a TMMBR message may be included in a RTCP during a 360 fisheye video call which is used by a receiving entity to dynamically request a different fisheye image configuration in established streams between sending/transmitting and receiving entities.

Referring to FIG. 9, a TMMBR message may include "N" parameter/field 910 and/or Fisheye image IDS parameter/field 920. In an embodiment, 4 bits may be assigned to the parameter "N" 910. "N" parameter 910 may represent the number of fisheye images/videos currently being received in the media session.

Fisheye image IDs parameter/field 920 may contain the identifiers for the fisheye images/videos which the receiver entity (receiving terminal) requests to the sender entity (transmitting terminal). In an embodiment, each identifier may be represented by 4 bits.

FIG. 10 shows an example of an SDP offer according to an embodiment of the disclosure.

Referring to FIG. 10, a SDP offer may be a SDP offer sent by a transmitting terminal in the case of a multi-stream media session configuration.

Referring to FIG. 10, each media line contains only one fisheye image/video, with parameters as the same in FIG. 8A or 8B. A group attribute (a=group) 1010 is used to group the four media lines which indicate that the four fisheye images/videos collectively make to up a single 360 camera configuration as a whole.

Figure 11:
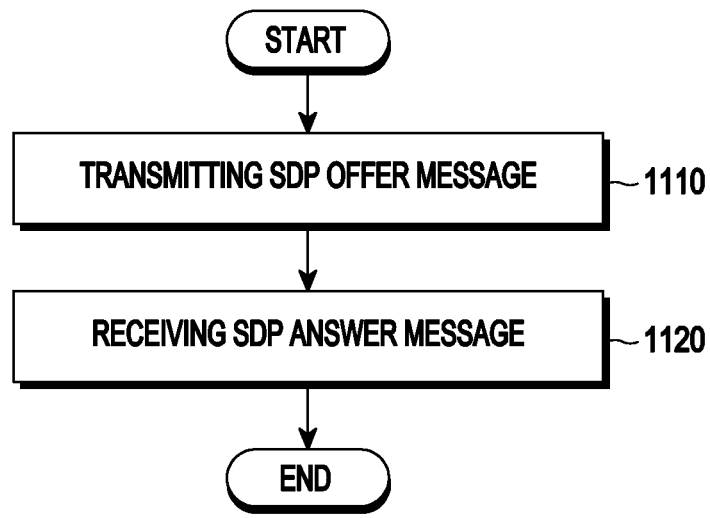
FIG. 11 shows a flowchart illustrating a method of a transmitting device according to an embodiment of the disclosure.

FIG. 11 shows a flowchart illustrating a method of a transmitting device according to an embodiment of the disclosure.

Referring to FIG. 11, in operation 1110, a transmitting device may transmit, to a receiving device, a Session Description Protocol (SDP) offer message for negotiation of parameter associated with a fisheye image.

In operation 1120, the transmitting device may receive, from the receiving device, a SDP answer message including second fisheye image related information generated based on first fisheye image related information included in the SDP offer message.

In an embodiment, the first fisheye image related information includes first maximum packing information indicating a maximum number of fisheye images that is available to be packed into one stream. For example, the first fisheye image related information may correspond to the SDP attribute 3gpp_fisheye (a=3gpp_fisheye) in the SDP offer as exemplified above. For example, the first maximum packing information may correspond to the <maxpack> parameter in the SDP offer as exemplified above.

In an embodiment, the first fisheye image related information may include first fisheye information indicating a total number of fisheye images output based on a camera configuration at a capturing terminal. For example, the first fisheye information may correspond to <fisheye>> parameter in the SDP offer as exemplified above.

In an embodiment, the first fisheye image related information may include first fisheye image list information. For example, first fisheye image list information may correspond to <fisheye-img> parameter in the SDP offer as exemplified above.

In an embodiment, the first fisheye image list information may include first fisheye image information for each of at least one fisheye image, and the first fisheye image information may include identification (id) information, azimuth information, elevation information, tilt information, and field of view (FoV) information for a corresponding fisheye image. For example, first fisheye image information may correspond to <fisheye-img-X> parameter in the SDP offer as exemplified above.

In an embodiment, the second fisheye image related information may include second maximum packing information indicating a number of fisheye images to be packed, and the second maximum packing information may be generated by the receiving device based on the first max packing information. For example, the second fisheye image related information may correspond to the SDP attribute 3gpp_fisheye (a=3gpp_fisheye) in the SDP answer as exemplified above. For example, the second maximum packing information may correspond to the <maxpack> parameter in the SDP answer as exemplified above.

In an embodiment, a value of the second maximum packing information is less than or equal to a value of the first maximum packing information of the first fisheye image list information.

In an embodiment, wherein the second fisheye image related information includes information for one or more fisheye images selected among the at least one fisheye image. For example, the information for one or more fisheye images selected may correspond to at least one <fisheye-img-X> parameter selected among <fisheye-img-X> parameters in the SDP offer as exemplified above.

In an embodiment, the transmitting device may transmit, to the receiving device, a real-time transport protocol (RTP)-based video stream including data of the selected one or more fisheye images, the RTP-based video stream may include a fisheye image related Supplemental Enhancement Information (SEI) message.

In an embodiment, the fisheye image may a 360-degree fisheye circular video.

Figure 12:
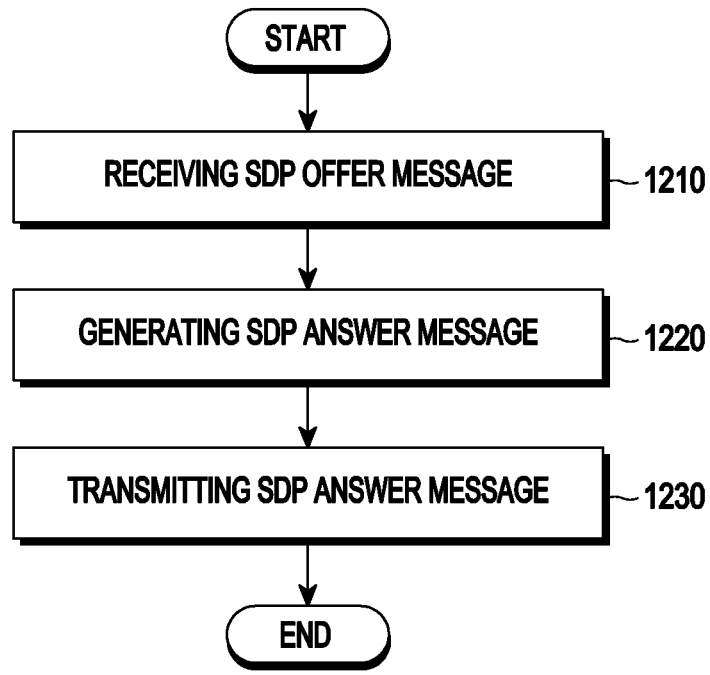
FIG. 12 shows a flowchart illustrating a method of a receiving device according to an embodiment of the disclosure.

FIG. 12 shows a flowchart illustrating a method of a receiving device according to an embodiment of the disclosure.

Referring to FIG. 12, in operation 1210, a receiving device may receive, from a transmitting device, a Session Description Protocol (SDP) offer message for negotiation of parameter associated with a fisheye image.

In operation 1220, the receiving device may generate a SDP answer message including second fisheye image related information, based on first fisheye image related information included in the SDP offer message.

In operation 1230, the receiving device may transmit, to the transmitting device, the SDP answer message, In an embodiment, the first fisheye image related information includes first maximum packing information indicating a maximum number of fisheye images that is available to be packed into one stream. For example, the first fisheye image related information may correspond to the SDP attribute 3gpp_fisheye (a=3gpp_fisheye) in the SDP offer as exemplified above. For example, the first maximum packing information may correspond to the <maxpack> parameter in the SDP offer as exemplified above.

In an embodiment, the first fisheye image related information may include first fisheye information indicating a total number of fisheye images output based on a camera configuration at a capturing terminal. For example, the first fisheye information may correspond to <fisheye>> parameter in the SDP offer as exemplified above.

In an embodiment, the first fisheye image related information may include first fisheye image list information. For example, first fisheye image list information may correspond to <fisheye-img> parameter in the SDP offer as exemplified above.

In an embodiment, the first fisheye image list information may include first fisheye image information for each of at least one fisheye image, and the first fisheye image information may include identification (id) information, azimuth information, elevation information, tilt information, and field of view (FoV) information for a corresponding fisheye image. For example, first fisheye image information may correspond to <fisheye-img-X> parameter in the SDP offer as exemplified above.

In an embodiment, the second fisheye image related information may include second maximum packing information indicating a number of fisheye images to be packed, and the second maximum packing information may be generated by the receiving device based on the first max packing information. For example, the second fisheye image related information may correspond to the SDP attribute 3gpp_fisheye (a=3gpp_fisheye) in the SDP answer as exemplified above. For example, the second maximum packing information may correspond to the <maxpack> parameter in the SDP answer as exemplified above.

In an embodiment, a value of the second maximum packing information is less than or equal to a value of the first maximum packing information of the first fisheye image list information.

In an embodiment, wherein the second fisheye image related information includes information for one or more fisheye images selected among the at least one fisheye image. For example, the information for one or more fisheye images selected may correspond to at least one <fisheye-img-X> parameter selected among <fisheye-img-X> parameters in the SDP offer as exemplified above.

In an embodiment, the receiving device may receive, from the transmitting device, a real-time transport protocol (RTP)-based video stream including data of the selected one or more fisheye images, the RTP-based video stream may include a fisheye image related Supplemental Enhancement Information (SEI) message.

In an embodiment, the fisheye image may a 360-degree fisheye circular video.

Figure 13:
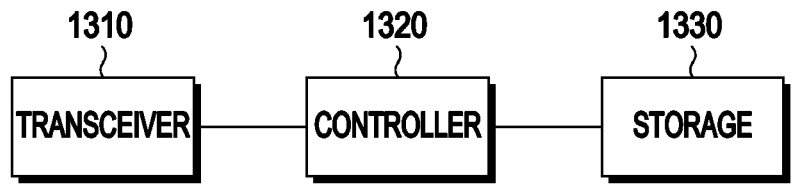
FIG. 13 is a block diagram of a UE (terminal) according to an embodiment of the disclosure.

FIG. 13 is a block diagram of a UE (terminal) according to an embodiment of the disclosure.

In an embodiment of FIG. 13, a UE (terminal) may be a transmitting device (terminal) and/or the receiving device (terminal) as exemplified above.

Referring to FIG. 13, the UE may include a transceiver 1310, a controller 1320, and storage 1330. In the disclosure, the controller 1320 may include a circuit, an application-specific integrated circuit (ASIC), or at least one processor.

The transceiver 1310 may transmit and receive signals to and from another entity.

The controller 1320 may control the overall operation of the UE according to the embodiments. For example, the controller 1320 may control the signal flow to perform the operations in FIGS. 4, 5, 6A, 6BA, 6BB, 7A, 7B, 8A, 8B, 9, 10, 11, and 12 described above.

The storage 1330 may store at least one of information exchanged through the transceiver and information generated by the controller.

Figure 14:
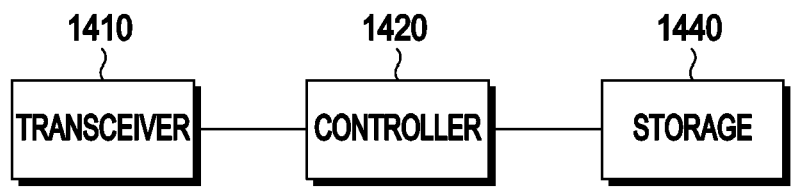
FIG. 14 is a block diagram of a base station according to an embodiment of the disclosure.

FIG. 14 is a block diagram of a base station according to an embodiment of the disclosure.

Referring to FIG. 14, a base station may include a transceiver 1410, a controller 1420, and storage 1440. In the disclosure, the controller 1420 may include a circuit, an ASIC, or at least one processor. For example, the base station may be a NodeB, eNodeB, or gNB.

The transceiver 1410 may transmit and receive signals to and from an UE and a network entity (function).

The controller 1420 may control the overall operation of the base station according to an embodiment. For example, the controller may control the signal flow to perform the operations in FIGS. 4, 5, 6A, 6BA, 6BB, 7A, 7B, 8A, 8B, 9, 10, 11, and 12 described above.

The storage 1440 may store at least one of information exchanged through the transceiver and information generated by the controller.

Figure 15:
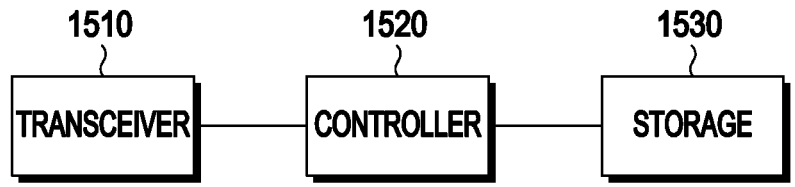
FIG. 15 is a block diagram of a network entity (function) according to an embodiment of the disclosure.

FIG. 15 is a block diagram of a network entity (function) according to an embodiment of the disclosure.

Referring to FIG. 15, a network entity (function) may include a transceiver 1510, a controller 1520, and storage 1530. In the disclosure, the controller 1520 may include a circuit, an ASIC, or at least one processor. For example, the network entity (function) may be a P-CSCF, S-CSCF, or I-CSCF.

The transceiver 1510 may transmit and receive signals to and from an UE and a base station.

The controller 1520 may control the overall operation of the network entity (function) according to an embodiment. For example, the controller may control the signal flow to perform the operations in FIGS. 4, 5, 6A, 6BA, 6BB, 7A, 7B, 8A, 8B, 9, 10, 11, and 12 described above.

The storage 1530 may store at least one of information exchanged through the transceiver and information generated by the controller.

The embodiments disclosed herein can be implemented through at least one software program running on at least one hardware device and performing network management functions to control the elements. The elements disclosed herein include blocks which can be a hardware device, a software module, or a combination of a hardware device and a software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a transmitting device, the method comprising:
   transmitting, to a receiving device, a session description protocol (SDP) offer message for negotiation of parameter associated with a fisheye image; and
   receiving, from the receiving device, a SDP answer message comprising second fisheye image related information generated based on first fisheye image related information included in the SDP offer message,
   wherein the first fisheye image related information comprises first maximum packing information indicating a maximum number of fisheye images that is available to be packed into one stream.

2. The method of claim 1, wherein the first fisheye image related information comprises first fisheye information indicating a total number of fisheye images output based on a camera configuration at a capturing terminal.

3. The method of claim 1,
   wherein the first fisheye image related information comprises first fisheye image list information,
   wherein the first fisheye image list information comprises first fisheye image information for each of at least one fisheye image, and
   wherein the first fisheye image information comprises identification (id) information, azimuth information, elevation information, tilt information, and field of view (FoV) information for a corresponding fisheye image.

4. The method of claim 3, wherein the second fisheye image related information comprises second maximum packing information indicating a number of fisheye images to be packed, the second maximum packing information being generated by the receiving device based on the first maximum packing information.

5. The method of claim 4, wherein a value of the second maximum packing information is less than or equal to a value of the first maximum packing information of the first fisheye image list information.

6. The method of claim 4, wherein the second fisheye image related information comprises information for one or more fisheye images selected among the at least one fisheye image.

7. The method of claim 6, further comprising:
   transmitting, to the receiving device, a real-time transport protocol (RTP)-based video stream comprising data of the selected one or more fisheye images,
   wherein the RTP-based video stream comprises a fisheye image related supplemental enhancement information (SEI) message.

8. The method of claim 1, wherein the fisheye image is a 360-degree fisheye circular video.

9. A method of a receiving device, the method comprising:
receiving, from a transmitting device, a session description protocol (SDP) offer message for negotiation of parameter associated with a fisheye image;
generating a SDP answer message comprising second fisheye image related information, based on first fisheye image related information included in the SDP offer message; and
transmitting, to the transmitting device, the SDP answer message,
wherein the first fisheye image related information comprises first maximum packing information indicating a maximum number of fisheye images that is available to be packed into one stream.

10. The method of claim 9, wherein the first fisheye image related information comprises first fisheye information indicating a total number of fisheye images output based on a camera configuration at a capturing terminal.

11. The method of claim 9,
wherein the first fisheye image related information comprises first fisheye image list information,
wherein the first fisheye image list information comprises first fisheye image information for each of at least one fisheye image, and
wherein the first fisheye image information comprises identification (id) information, azimuth information, elevation information, tilt information, and field of view (FoV) information for a corresponding fisheye image.

12. The method of claim 11, wherein the second fisheye image related information comprises second maximum packing information indicating a number of fisheye images to be packed, the second maximum packing information being generated by the receiving device based on the first maximum packing information.

13. The method of claim 12, wherein a value of the second maximum packing information is less than or equal to a value of the first maximum packing information of the first fisheye image list information.

14. The method of claim 12, wherein the second fisheye image related information comprises information for one or more fisheye images selected among the at least one fisheye image.

15. The method of claim 14, further comprising:
receiving, from the transmitting device, a real-time transport protocol (RTP)-based video stream comprising data of the selected one or more fisheye images,
wherein the RTP-based video stream comprises a fisheye image related supplemental enhancement information (SEI) message.

16. The method of claim 9, wherein the fisheye image is a 360-degree fisheye circular video.

17. A transmitting device, the transmitting device comprising:
a transceiver; and
a processor configured to:
transmit, to a receiving device, a session description protocol (SDP) offer message for negotiation of parameter associated with a fisheye image, and
receive, from the receiving device, a SDP answer message comprising second fisheye image related information generated based on first fisheye image related information included in the SDP offer message,
wherein the first fisheye image related information comprises first maximum packing information indicating a maximum number of fisheye images that is available to be packed into one stream.

18. The transmitting device of claim 17, wherein the second fisheye image related information comprises second maximum packing information indicating a number of fisheye images to be packed, the second maximum packing information being generated by the receiving device based on the first maximum packing information.

19. A receiving device, the receiving device comprising:
a transceiver; and
a processor configured to:
receive, from a transmitting device, a session description protocol (SDP) offer message for negotiation of parameter associated with a fisheye image,
generate a SDP answer message comprising second fisheye image related information, based on first fisheye image related information included in the SDP offer message, and
transmit, to the transmitting device, the SDP answer message,
wherein the first fisheye image related information comprises first maximum packing information indicating a maximum number of fisheye images that is available to be packed into one stream.

20. The receiving device of claim 19, wherein the second fisheye image related information comprises second maximum packing information indicating a number of fisheye images to be packed, the second maximum packing information being generated by the receiving device based on the first maximum packing information.

* * * * *